United States Patent
Blanchard et al.

(12)

(10) Patent No.: US 6,767,526 B1
(45) Date of Patent: Jul. 27, 2004

(54) METHOD FOR TREATING BY COMBUSTION CARBON-CONTAINING PARTICLES IN AN INTERNAL COMBUSTION ENGINE EXHAUST CIRCUIT

(75) Inventors: Gilbert Blanchard, Lagny le Sec (FR); William Mustel, Montmorency (FR); Thierry Seguelong, Puteaux (FR)

(73) Assignee: Rhodia Chimie, Courbevoie Cedex (FR)

( * ) Notice: Subject to any disclaimer, the term of this patent is extended or adjusted under 35 U.S.C. 154(b) by 0 days.

(21) Appl. No.: 09/720,362

(22) PCT Filed: Jun. 10, 1999

(86) PCT No.: PCT/FR99/01378

§ 371 (c)(1),
(2), (4) Date: Jun. 7, 2001

(87) PCT Pub. No.: WO99/67509

PCT Pub. Date: Dec. 29, 1999

(30) Foreign Application Priority Data

Jun. 22, 1998 (FR) ............................... 98 07859

(51) Int. Cl.[7] ............................... C01B 31/18

(52) U.S. Cl. ................................ 423/418.2; 423/437.1
(58) Field of Search ................. 423/418.2, 437.1, 423/220, 247, 405, 213.2

(56) References Cited

U.S. PATENT DOCUMENTS

| 4,065,919 A | * | 1/1978 | Eknayan .................... 60/274 |
| 4,902,487 A | * | 2/1990 | Cooper et al. ........... 423/215.5 |
| 6,294,141 B1 | * | 9/2001 | Twigg et al. ............ 423/213.7 |
| 2002/0046562 A1 | * | 4/2002 | Allansson et al. ........... 60/278 |

* cited by examiner

*Primary Examiner*—Stanley S. Silverman
*Assistant Examiner*—Edward M. Johnson
(74) *Attorney, Agent, or Firm*—Burns, Doane, Swecker & Mathis, L.L.P.

(57) ABSTRACT

A process for the combustion treatment of carbonaceous particles collected on a filter situated in an exhausted circuit of an internal combustion engine is disclosed. The combustion of the particles is brought about by contacting them with a gas mixture including at least nitrogen dioxide generated within the exhaust circuit of the engine, the particles having been seeded prior to their combustion with at least one catalyst of their oxidation.

40 Claims, 4 Drawing Sheets

Figure 1:
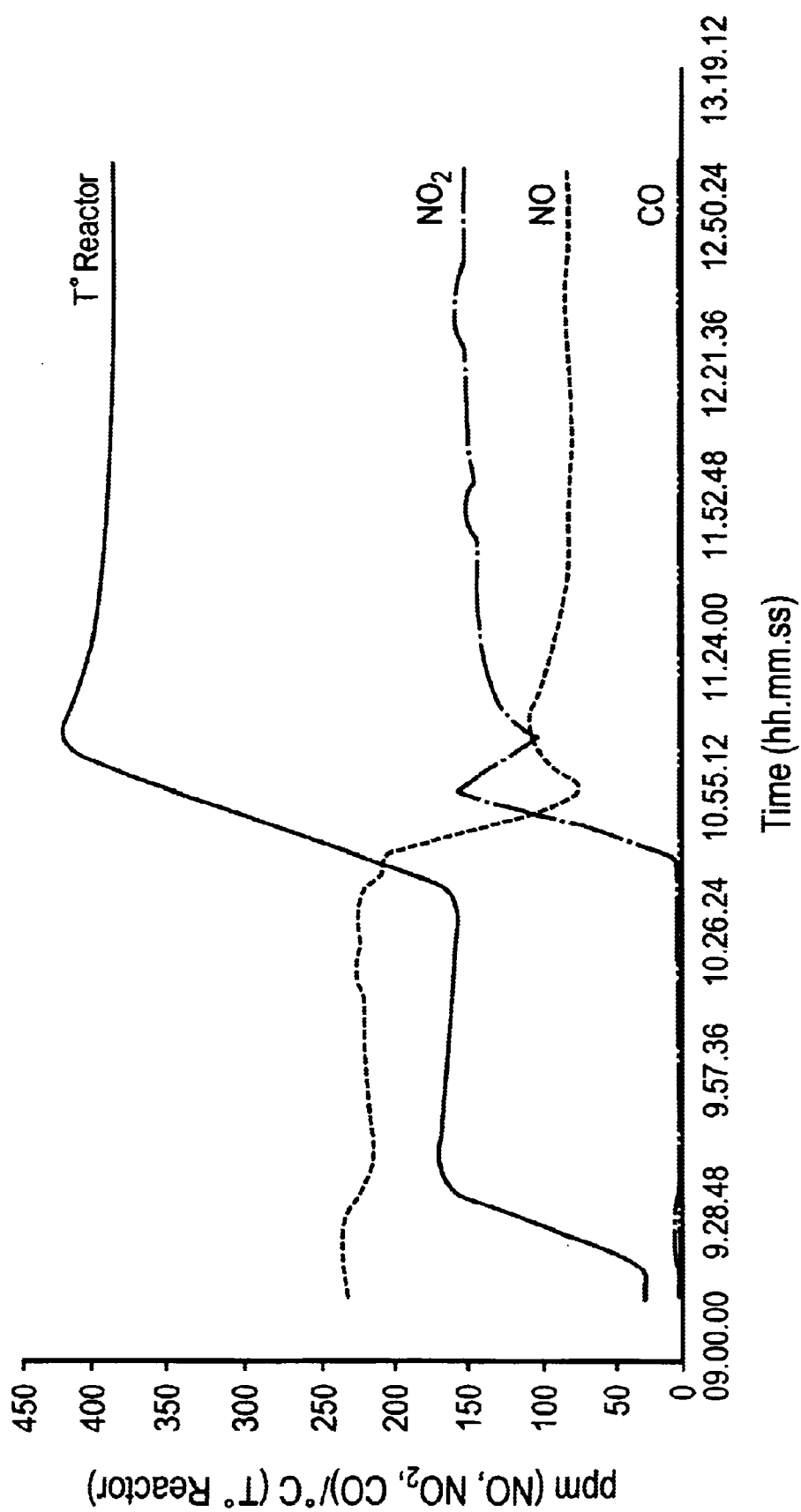

METHOD FOR TREATING BY COMBUSTION CARBON-CONTAINING PARTICLES IN AN INTERNAL COMBUSTION ENGINE EXHAUST CIRCUIT

The present invention relates to a process for reducing the harmful emissions of internal combustion engines and significantly limiting their carbonaceous discharges.

It relates more particularly to the conjoint use of at least one oxidation catalyst for the said carbonaceous particles and of nitrogen dioxide for the combustion of the carbonaceous matter issuing from internal combustion-engines.

When fuels are burnt, the carbonaceous products or hydrocarbons form, in their combustion products, carbonaceous particles which are also referred to, in the remainder of the description, by the expression "soot(s)"; which are reputed to be harmful both to the environment and to health. Moreover, these soots deposit on all of the internal walls of the engine and may give rise to malfunctions, especially in turbochargers.

Consequently, the search has long been on for techniques which make it possible to reduce the emission of these carbonaceous particles. This search is, moreover, concommitant with the requirement not to increase the emission of carbon monoxide and of harmful and mutagenic gases such as oxides of nitrogen.

A very great number of solutions have been proposed for reducing these carbonaceous emissions.

Among these solutions, the technique employed most widely consists in adapting in the exhaust circuits a filter capable of halting all or a very great proportion of the carbonaceous particles produced by the combustion of the various fuels. Filters have therefore been produced which, when installed in the exhaust circuits, allow soot emissions to be reduced by at least 85% by mass.

The problem to be solved then moved to the level of these filters. Accummulating progressively in the filters, the soots cause firstly an increase in pressure loss and, secondly, the beginning of an occlusion which leads to a drop in performance of the internal combustion engine.

The research efforts then shifted to the burning of soots collected by these filters.

This so-called burning operation is extremely delicate in terms of its provision and implementation.

It is possible to bring about the combustion of the soots intermittently either by an electrical heater or by a burner or any other technique employing an external energy source.

Another solution consists in drawing the heat required to ignite these soots from the engine itself, so as to heat the soots accummulated in the filter and in so doing to bring about their inflammation (temperature of the order of 500–600° C.).

It has also been proposed to introduce inflammation catalyst precursors into the various fuels so as to lower the inflammation temperature of the soots.

Another solution is aimed at utilizing oxidation catalysts based on noble metals deposited on supports based on alumina or titanium. They make it possible to facilitate, at low temperature, the oxidation of the carbon monoxide and gaseous hydrocarbons emitted by diesel engines. The discharge of carbon monoxide and hydrocarbons unburnt at 300° C. is thereby reduced significantly, to the order of 80 to 90%. However, it is important to note that these catalysts have no oxidizing action whatsoever on the carbonaceous fraction of the soots and, furthermore, have the disadvantage of discharging into the atmosphere not inconsiderable amounts of nitric acid, which give rise to an increase in the acid rains harmful to man and the environment. However, as mentioned before, the search for a solution to the combustion of the soots is concommitant with the requirement not to increase the emission of carbon monoxide nor of gases reputed to be mutagenic and toxic, such as oxides of nitrogen.

One of the most interesting solutions to date consists in adding directly to the fuels an additive deriving from transition metals, alkali metals, alkaline earth metals and/or rare earth metals (EP 0 599 717). The combustion of these soots is significantly improved by this means. However, for the oxidation of these soots to be optimum, it remains necessary for the temperature of the gases to be treated to be at least of the order of 300° C.

Another proposed solution takes advantage of the composition of the exhaust gases emerging from diesel engines. Generally, these gases comprise significant amounts of oxides of nitrogen (NO, $NO_2$), oxygen, carbon monoxide, carbon dioxide, water and, if appropriate, sulphur dioxide. Thus the patent EP 341 832 proposes converting this nitrogen monoxide into nitrogen dioxide by catalytic oxidation and using the resultant nitrogen oxide as an oxidizing agent for the particles of carbon accummulated on the filter. However, the temperature conditions within which combustion takes place are narrow. They are limited to a temperature of between 250° C. and 400° C. Finally, it appears that the reaction rate of oxidation of the carbonaceous particles by nitrogen dioxide is reduced not inconsiderably by the sulphur dioxide and when the ratio between the oxides of nitrogen ($NO+NO_2$) and the carbon formed by the engine is insufficient.

The object of the present invention is more particularly to provide a novel treatment process which makes it possible specifically to optimize the combustion of carbonaceous particles within a significantly widened temperature range.

More precisely, the present invention provides a process for the combustion treatment of carbonaceous particles collected on a filter situated in an exhaust circuit of an internal combustion engine, characterized in that the combustion of the said particles is brought about by contacting them with a gas mixture comprising at least nitrogen dioxide generated within the exhaust circuit of the said engine, the said particles having been seeded prior to their combustion with at least one catalyst of their oxidation.

Unexpectedly, the inventors found, in fact, that when the oxidation of soots by nitrogen dioxide is conducted in the presence of a soot oxidation catalyst, also denoted hereinbelow by the name "SOC", It is possible to effect their combustion within a significantly widened temperature range.

The combustion of the particles is advantageously carried out at a temperature lower than that required for the combustion of particles simply seeded with an oxidation catalyst. This temperature of combustion by nitrogen dioxide is also less than that required for the combustion of unseeded particles.

The process claimed also enables the combustion of particles in a wide temperature range, which corresponds to that encountered for diesel engine exhaust gases. Therefore, in contrast to other processes, the process of the invention is effective at a very low exhaust temperature, i.e. at less than 250° C. and, in particular, in the range 200–250° C. However, it remains effective at temperatures exceeding 400° C. as well.

For the purposes of the invention, the term "particles seeded with an oxidation catalyst" is intended to cover carbonaceous particles in and/or on which the soot oxidation catalyst SOC is dispersed in the form of very fine particles. Within the context of the invention, the carbonaceous particles possess the feature of being already combined with the oxidation catalyst when they are placed in the presence of the nitrogen dioxide.

As far as the oxidation catalyst SOC is concerned, it comprises at least one element selected from transition metals, alkali metals and alkaline earth metals, such as manganese, iron, copper, sodium, nickel and scandium, and the rare earth metals. These elements are preferably incorporated in the said catalyst in the form of their oxides. The catalyst can of course comprise a plurality of elements, it being possible for each element to be present, independently of the others, in the form of its corresponding oxide or otherwise.

In accordance with a preferred embodiment of the invention, the oxidation catalyst is a compound containing at least one rare earth.

The expression "rare earth" is intended to denote the elements whose atomic number is between 57 and 71, and also yttrium.

Indeed, the rare earths, and especially the oxides of rare earths, such as, in particular, those of cerium, effectively catalyse the oxidation of carbonaceous materials.

As far as the rare earth is concerned, it can be selected more particularly from cerium, yttrium, neodymium, gadolinium, praseodymium, lanthanum and mixtures thereof. Cerium, lanthanum, neodymium, yttrium, praseodymium and mixtures thereof are particularly preferred. In the specific case of mixtures of rare earths, it is preferable for cerium and/or lanthanum to be predominant.

Within the scope of this invention it is also possible to use a compound containing at least one rare earth which comprises at least cerium in a mixture with one or more other elements.

As a representative of this other element, mention may be made more particularly of zirconium, alkali metals, alkaline earth metals and transition elements, such as the elements of groups IB, VIIA and VIII of the Periodic Table, especially copper, manganese and iron.

For the entirety of the specification, the Periodic Table is that published in the supplement to Bulletin de la Société Chimique de France, No. 1, January 1996.

In their catalytic function, these metals are preferably in the form of their oxides.

The oxidation catalyst SOC, seeded at the level of the soots, is advantageously incorporated into the latter via the introduction into the fuel of one of its derivatives such as a salt, sol or organic complex.

In the sense of the invention, the term "sol" is intended to denote an organic colloidal suspension based on at least one of the abovementioned elements.

Organic sol particularly suitable for the invention are those described in the applications EP 671 205, EP 737 236 and WO 97/19022. Regarding the preparation of these sols reference may also be made to the teaching of these documents.

Another possibility consists in introducing the catalyst SOC in various forms, alternatively into the air at the intake of the engine or into the exhaust gas recirculation (EGR) circuit or at the exhaust itself upstream of the particle filter.

Advantageously, the amount of oxidation catalyst SOC to be introduced into the engine is determined such that its content at the level of the carbonaceous particles reaches a level of between approximately 0.1% and 30%, preferably between 0.1 and 15%, expressed by weight of the catalytic element relative to the weight of the soot. Advantageously, this content is at least 0.5% and, preferably, at least As far as the nitrogen dioxide required for the combustion of the said carbonaceous particles is concerned, its concentration must be sufficient to enable the oxidation of the carbonaceous particles to be promoted.

As mentioned beforehand, the exhaust gases emitted by combustion engines may, in addition to the carbonaceous particles, comprise unburnt hydrocarbons, nitrogen monoxide, oxygen, carbon monoxide, carbon dioxide, nitrogen dioxide and possibly sulphur dioxide.

Naturally, nitrogen monoxide is present in a majority proportion relative to the nitrogen dioxide.

Consequently, the concentration of $NO_2$ at the exhaust must be sufficient to allow the oxidation of the carbonaceous particles, since a lack of $NO_2$ results in partial oxidation of the soots and hence in a progressive accummulation in the filter.

According to a first variant of the invention, it is possible to consider adjusting the concentration of nitrogen dioxide required for the combustion of the said carbonaceous particles by a change in engine control, performed continuously or discontinuously so as to induce the burning of the soots collected on the filter.

According to a second variant, which is the preferred variant to date, the amount of nitrogen dioxide required for the combustion of the carbonaceous particles is generated catalytically. It is obtained by catalytic conversion of nitrogen monoxide.

Any known catalyst for converting nitrogen monoxide to nitrogen dioxide can be employed in the context of the present invention. In particular, it is possible to employ catalysts already used in the automotive sector for the catalytic conversion of exhaust gases.

By way of illustration of such catalysts, mention may be made in particular of those based on platinum, palladium, ruthenium, rhodium and their mixtures such as metal oxides of the platinum group, for instance rhodium oxide, $Rh_2O_3$ or the like. Also suitable are simple oxides or mixed oxides such as transition metal oxides and, more particularly, those based on cerium and/or manganese, such as $CeO_2$, $Mn_2O_3$, $Mn_2O$—$CeO_2$, $Mn_2O_3$—$CeO_2$—$ZrO_2$ and the perovskite systems.

These metals may be deposited on supports of the alumina, titanium, silica or zeolite type in a pure or doped form.

By way of illustration of this type of catalyst mention may be made more particularly of a catalyst based on platinum deposited on a lanthanum-doped titanium oxide, This type of catalyst is marketed by Rhodia (WO 97/49481).

The catalytic conversion of the nitrogen monoxide to nitrogen dioxide can be performed in accordance with two embodiments. It can be performed either prior to the oxidation of the carbonaceous particles by the nitrogen dioxide thus formed, or concomitantly with the oxidation of the carbonaceous particles.

According to the first embodiment, the nitrogen monoxide is converted to nitrogen dioxide prior to the oxidation of the carbonaceous particles. Thus it is performed upstream of the filter containing the carbonaceous particles to be oxidized. To achieve this, the exhaust gas containing nitrogen monoxide is contacted with a conversion catalyst, CC, situated upstream of the filter containing the carbonaceous particles to be oxidized. This conversion catalyst CC for converting nitrogen monoxide to nitrogen dioxide is deposited on a support placed upstream of the filter containing the carbonaceous particles to be oxidized and through which the said exhaust gas passes before coming into contact with the filter comprising the said particles. In accordance with this embodiment, the support and the filter are arranged in series.

In such a case, it is desirable for the distance between them not to be too great, so as to prevent the incidence of thermodynamic equilibrium between the nitrogen monoxide and nitrogen dioxide, which would tend to regenerate nitrogen monoxide. It is clear that this adjustment is within the expertise of the person skilled in the art.

In a second embodiment of the invention, the catalytic conversion of the nitrogen monoxide to nitrogen dioxide is carried out directly at the level of the filter on which the carbonaceous particles are collected. The catalyst required fox the conversion of the nitrogen monoxide to nitrogen dioxide is therefore present, in this particular case, at the level of the filter containing the carbonaceous particles to be oxidized.

The catalyst for converting the nitrogen monoxide to nitrogen dioxide can be employed in the form of a layer applied to the surface of a support. This mode of application is more particularly preferred when the conversion is performed prior to the oxidation of the carbonaceous particles.

It is likewise possible to consider employing this conversion catalyst in a particulate form, especially in the form of granules, beads and cylinders. This second formulation is more particularly appropriate when the conversion of nitrogen monoxide to nitrogen dioxide and the oxidation of the carbonaceous particles by this nitrogen dioxide are performed concomitantly at the surface of the filter for carbonaceous particles to be oxidized.

A third embodiment of the invention consists in the catalyst for converting the nitrogen monoxide to nitrogen dioxide being combined with a so-called $NO_x$ trap system. This is a catalyst system capable of oxidizing the nitrogen monoxide to nitrogen dioxide and then adsorbing the nitrogen dioxide thus formed. The nitrogen dioxide stored in this way is released only under specific conditions. These specific conditions are linked, in particular, to the temperature and/or the oxygen/hydrocarbons ratio in the exhaust (N. Takahashi et al.; Catalysis Today; No. 27, 1996, 63–69). These $NO_x$ traps are generally based on platinum and barium.

According to one particular embodiment, this $NO_x$ trap system can consist of a composition comprising a support based on an oxide of cerium, an oxide of zirconium and an oxide of scandium or of a rare earth other than cerium and an active phase based on manganese and on at least one other element, selected from alkali metals, alkaline earth metals and rare earth metals. Also suitable is a composition comprising a supported phase containing manganese and at least one other element selected from terbium, gadolinium, europium, samarium, neodymium and praseodymium and a support based on cerium oxide or a mixture of cerium oxide and zirconium oxide.

These systems are generally provided in the form of powders and may if desired be shaped so as to be provided in the form of granules, beads, cylinders or honeycombs of varying dimensions. They may also be used in catalyst systems comprising a coating (washcoat) having catalytic properties and based on these systems, on a substrate of the metal monolith type, for example, or made of ceramic.

An $NO_x$ trap system of this kind can be employed in the context of the present invention in accordance with two embodiments.

According to a first embodiment, it is possible to consider depositing the system on the support comprising the conversion catalyst, CC, for converting the nitrogen monoxide to nitrogen dioxide, the said catalyst being placed upstream of the filter containing the carbonaceous particles to be oxidized.

According to a second embodiment, this $NO_x$ trap system is deposited together with the conversion catalyst, CC, on the filter containing the carbonaceous particles to be oxidized.

According to one particular embodiment of the invention, the nitrogen dioxide is generated by passing the exhaust gases through a preferably monolithic support which is more preferably of the "ceramic honeycomb" type and on which is deposited at least one catalyst for converting the nitrogen monoxide to nitrogen dioxide, preferably a platinum-based catalyst. The nitrogen dioxide generated in this way is subsequently transported by the exhaust gases to the filter comprising the carbonaceous particles to be oxidized. The said filter is placed downstream of the support and at a distance sufficient for the nitrogen dioxide coming into contact with the particles to be present in an amount sufficient to ensure their effective oxidation.

More particularly, as far as the filter on whose surface the carbonaceous particles are fixed is concerned, it can be conventional in form and structure. Conventionally, it comprises one or more metal-mesh sieves through which the exhaust gases circulate. However, it may also be a filter of the "ceramic filtering wall" type or "ceramic foam" type, or may comprise fibre materials.

The process according to the invention makes it possible advantageously to carry out combustion at a range of temperatures which is significantly enlarged in comparison to the conventional processes. The results presented in the examples below specifically illustrate this efficacy.

The examples and the figures presented hereinbelow are given by way of illustration and are not limitative of the present invention.

FIGURES

FIG. 1

Infrared analysis of the composition of control exhaust gas (with a catalyst for converting NO to $NO_2$ and an alumina impregnated with 15% by weight of cerium) at the reactor outlet.

FIG. 2

Infrared analysis of the composition of control exhaust gases (with a catalyst for converting NO to $NO_2$ and unseeded soots) at the reactor outlet.

FIG. 3

Infrared analysis of the composition of exhaust gas seeded with a SOC catalyst and contacted with a catalyst CC, upstream of the reactor.

FIG. 4

Infrared analysis of the composition of seeded soots emerging from an engine and contacted with a catalyst CC upstream of the reactor.

MATERIALS

In Examples 1 to 4 below, the conversion catalyst, CC, employed at the inlet of the reactor is a conversion catalyst based on platinum deposited on a lanthanum-doped titanium oxide (WO 97/49481). This type of catalyst is very effective for oxidizing NO to $NO_2$ at 200° C. and above.

In Examples 1 and 3, the alumina or soot employed at the reactor outlet is an industrial product. In these two examples, the alumina—CONDEA® marketed by CONDEA CHEMIE—or the soot (ref. ELFLEX 125 from CABOT) were impregnated beforehand with the organic sol EOLYS® containing 25% by weight of Ce and marketed by Rhodia. Following impregnation, the product is dried at 100° C. in air and then at 250° C. in nitrogen before being employed in the combustion test. The cerium oxide content was held constant at 15% by weight of the system.

In Example 4, the soot employed corresponds to a soot collected (on an engine bench operating in accordance with the cycle UDC (European Urban Driving Cycle) in a particle filter. For this test, the gas-oil employed is admixed with 100 ppm of cerium from the organic sol EOLYS®.

The conditions of the test for oxidizing the NO and the soots employed for Examples 1 to 4 are identical and are described in Example 1.

The composition of the gases of the reactor outlet is analysed by FTIR, carried out directly without condensing the effluents in order to avoid trapping of $HNO_2$ or $HNO_3$, but with dilution of the stream of 30 l/h of reaction mixture with 90 l/h of dry nitrogen in order to escape the interfering effects of $H_2O$ on the infrared analysis of NO and $NO_2$. The FTIR analyser used is that marketed by the NICOLET Company.

EXAMPLE 1

In this Control Test 1 the system is composed as follows:
at the inlet, 50 mg of $Pt/TiO_2$ catalyst diluted in 150 mg of SiC;
at the outlet, 20 mg of $Al_2O_3$ impregnated with 15% $CeO_2$ diluted in 150 mg of SiC.

Following stabilization of the catalyst system at 150° C. for 1 h subject to the stream of the reaction mixture—NO= 900 ppm, $O_2$=10%, $H_2O$=10%, made up to 100% with $N_2$—the temperature of the reactor is taken from 150 to 400° C. at 10° C./min and then stabilized at 400° C.

The results reported in FIG. 1 show that:
From 220° C. the $Pt/TiO_2$ catalyst is active in the oxidation of NO to $NO_2$. The oxidation maximum of NO to $NO_2$ is of the order of 75% at 350° C. and then stabilizes at 400° C. and results in a ratio $NO_2$=65%/NO=35%.

No formation of CO is found, which confirms that the alumina impregnated with 15% $CeO_2$ is inert to the reactions employed.

Consequently, this reference test shows that, in the absence of soot, the platinum-based catalyst oxidizes the NO to $NO_2$ from 220° C.

EXAMPLE 2

The procedure is as in Example 1, with the combination in this Control Test 2 of:
at the reactor inlet: 50 mg of $Pt/TiO_2$ catalyst diluted in 150 mg of SiC;
at the reactor outlet: 20 mg of CABOT soot diluted in 150 mg of SiC.

Figure 2:
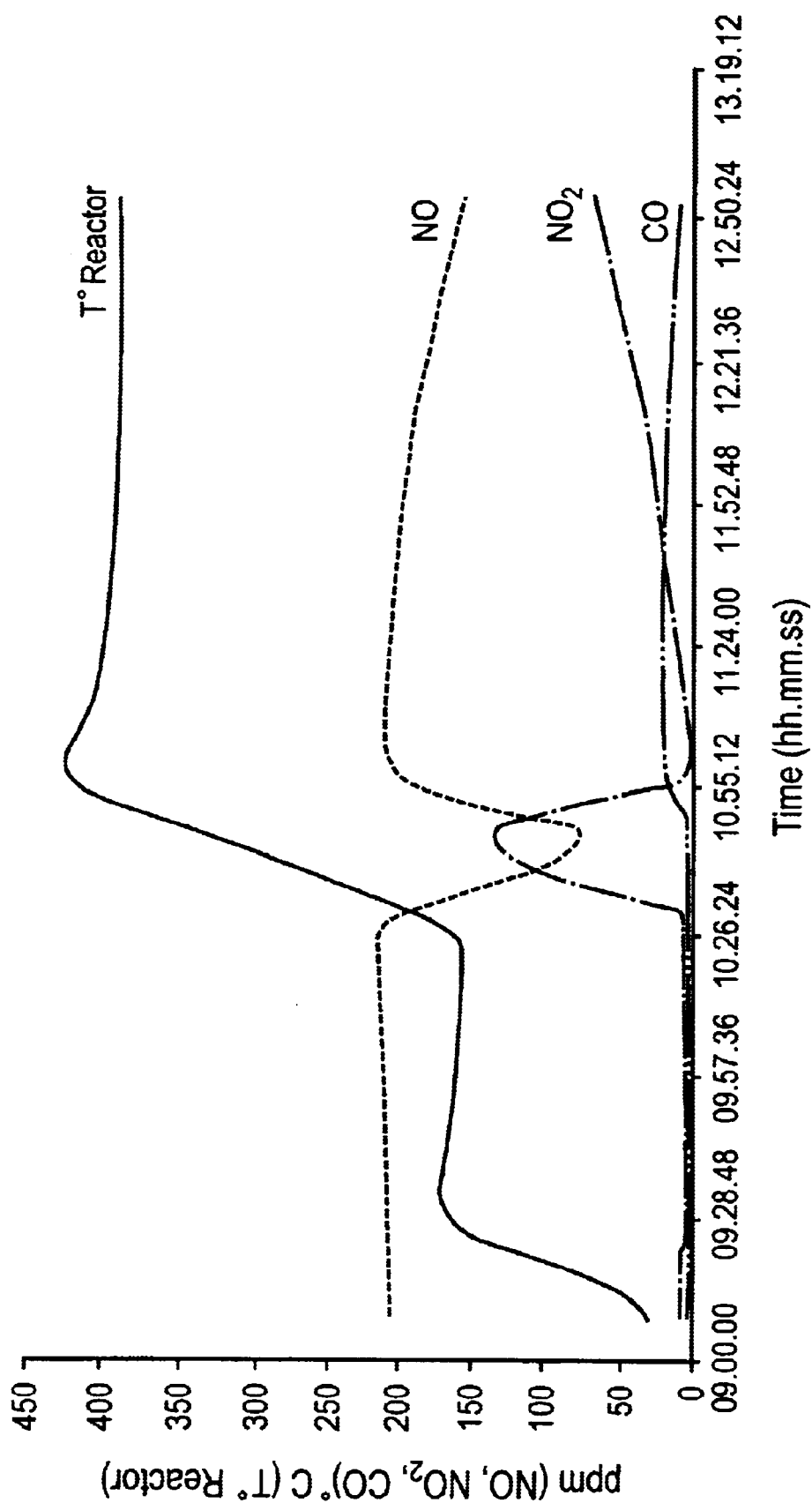

The results reported on the graph in FIG. 2 show that:
From 200° C., the $Pt/TiO_2$ catalyst oxidizes NO to $NO_2$ as in the control test of Example 1. The oxidation maximum is observed for a temperature of 350° C. and then the concentration of $NO_2$ reduces very rapidly between 350 and 400° C. At the plateau temperature at 400° C. no $NO_2$ is detected; all of the oxides of nitrogen are detected in the form of NO.

From 380° C., the CO content becomes significant, which indicates the beginning of slow combustion of the CABOT soot by the $NO_2$.

This second control test shows that, under the conditions of diesel application, the platinum-based catalyst oxidizes the NO to $NO_2$ from 200° C. and then, from 350° C., the $NO_2$ formed on the catalyst is reduced by the carbon from the CABOT soot in accordance with the chemical reactions

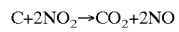

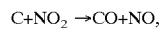

which leads to equilibrium at 400° C. at a level of NO which is identical to the original level and at a concentration of $NO_2$ which is zero at the beginning of the plateau and then increases substantially over time.

EXAMPLE 3

The procedure is as in Example 1, with the combination in Test 3 of:
at the reactor inlet, 50 mg of the $Pt/TiO_2$ catalyst diluted in 150 mg of SiC;
at the reactor outlet, 20 mg of a CABOT soot seeded with 15% by weight of $CeO_2$ from the additive EOLYS® diluted in 150 mg of SiC.

Figure 3:
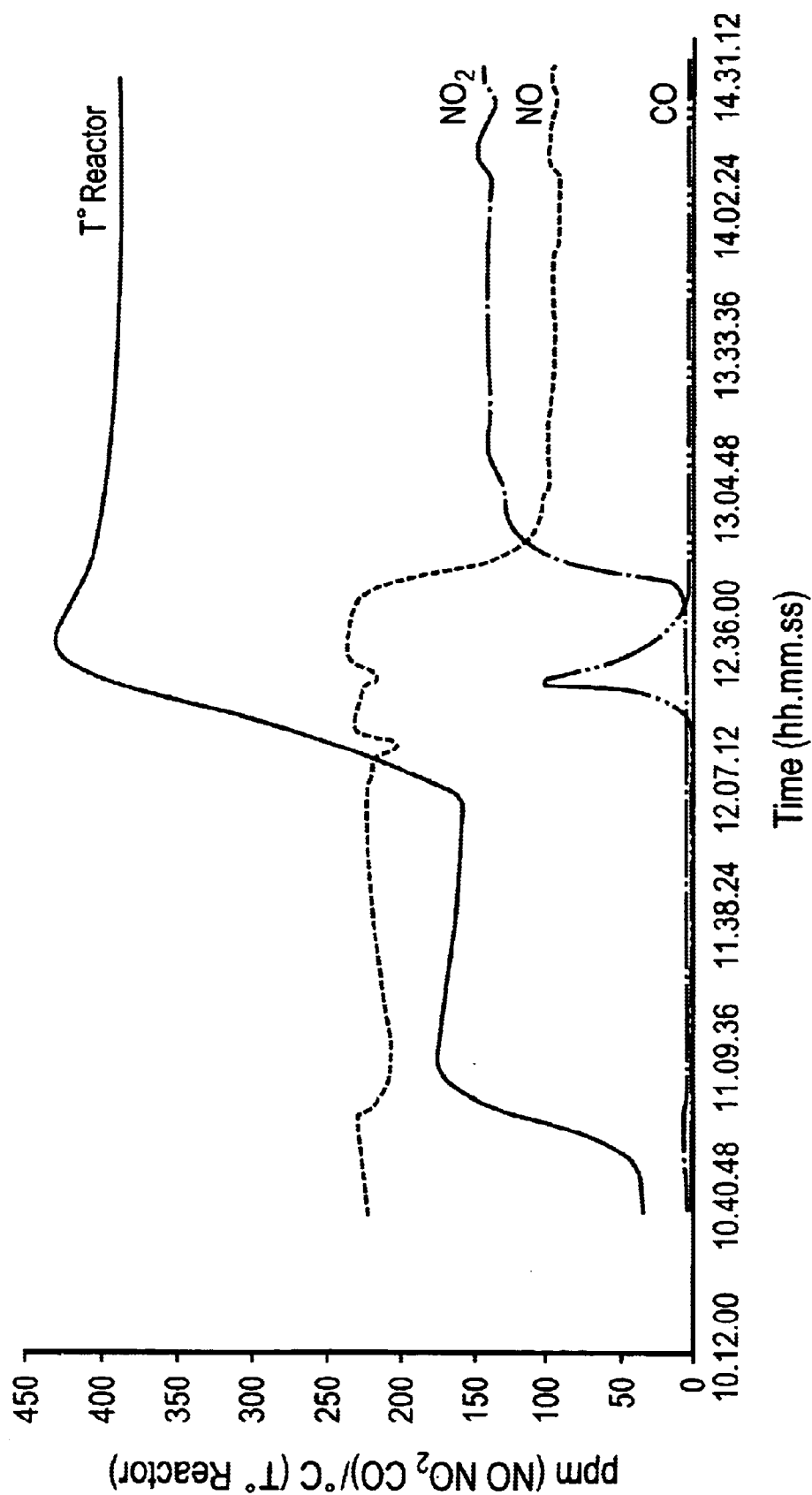

The results reported in FIG. 3 show that:
the conversion of NO to $NO_2$ begins from 220° C.; around 240° C., an $NO_2$ content of the order of 10 ppm is detected;
from 240° C., $NO_2$ is no longer detected, which is manifested in an NO signal which is identical to that observed at the plateau of 150° C.;
from 300° C., significant formation of CO is observed; the quantity of CO produced is of the order of 100 ppm at 380° C.;
at the temperature of 400° C., analysis of the reactor outlet gas reveals a CO content of zero and a high level of oxidation of NO to $NO_2$.

This test of the invention shows that the combination of a conversion catalyst and a soot seeded with cerium oxide induces the combustion of the soot from 240° C. onwards. The reactions employed are as follows:

This manifests itself in an absence of $NO_2$ production between 240 and 400° C.

EXAMPLE 4

The procedure is as in Example 3, with the combination this time, in Test 4, of 50 mg of $Pt/TiO_2$ conversion catalyst and 20 mg of soot from an engine as a replacement for the CABOT soot described in Example 3.

Analysis of the chemical composition of this soot, collected in a particle filter mounted on a diesel vehicle operating with a gas-oil admixed with 100 ppm of the additive EOLYS marketed by Rhodia, shows that the $CeO_2$ content is 13.4% by weight relative to the crude soot.

Figure 4:
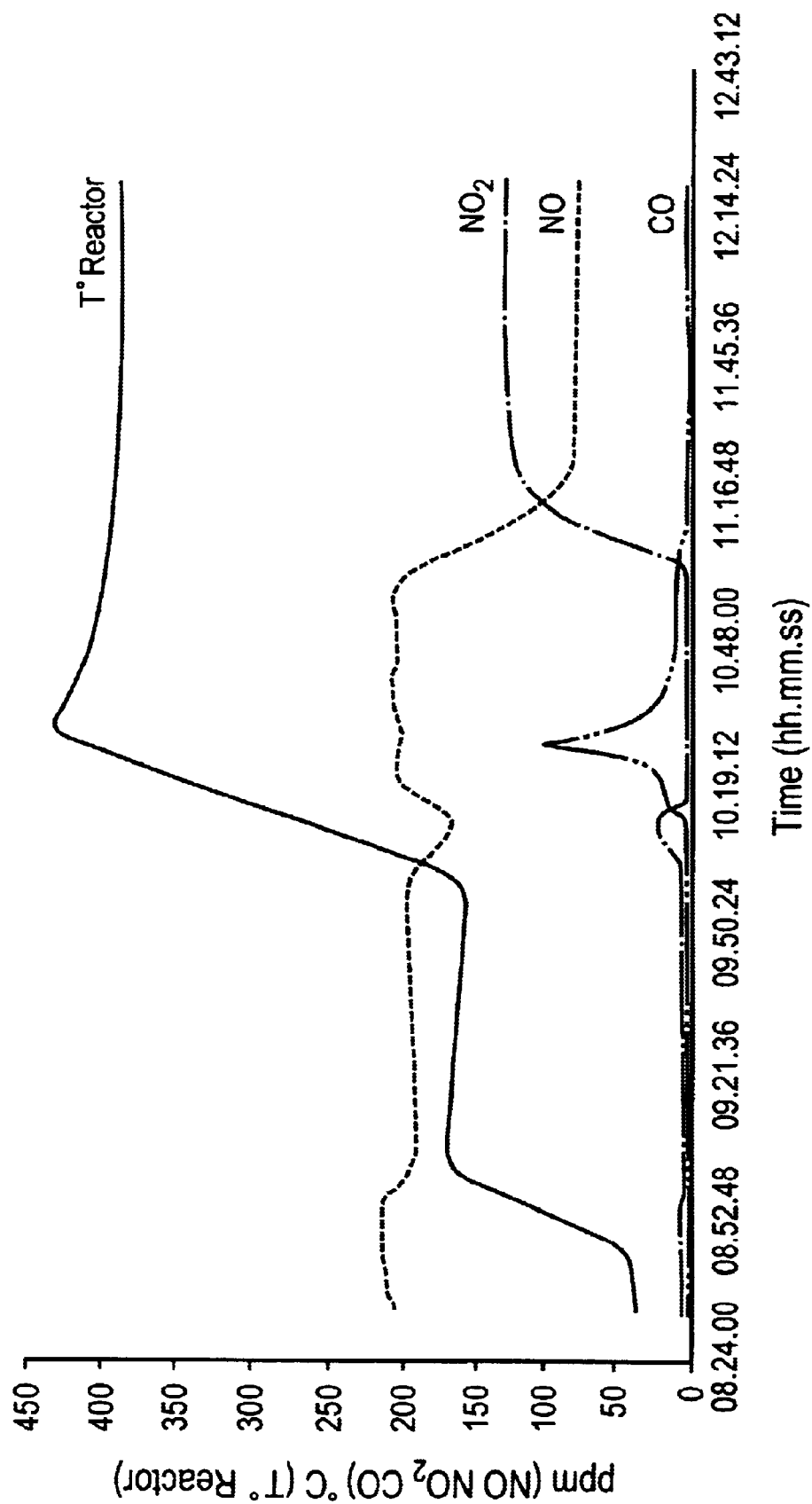

The results reported in FIG. 4 confirm the results of Test No. 4 which are characteristic of a commencement of oxidation of NO to $NO_2$ from 220° C. onwards. Since all of the soot employed in the test is oxidized by the $NO_2$ produced by the upstream catalyst, the outlet composition corresponds to an $NO/NO_2$ ratio which is characteristic of the activity of the $Pt/TiO_2$ catalyst.

The results obtained clearly show that:
The inflammation temperature of the soots is lowered significantly when the carbon particles contain cerium oxide from an additive such as the product EOLYS®. In the absence of this additive, the reaction of oxidation of the carbon by the $NO_2$ produced on the platinum-based catalyst situated upstream takes place from 350° C. as against 220° C. when the soot contains cerium oxide.

The concentration of $NO_2$ at the outlet of the reactor containing the combination at the inlet of an oxidation catalyst and at the outlet of an additivized soot is very strongly reduced up to 400° C. In the absence of cerium oxide dispersed in and/or on the soot and/or in the absence of soot downstream of the platinum-based oxidation catalyst, $NO_2$ is detected predominantly in the reaction stream. Under in-vehicle service conditions, this would be manifested in a discharge of nitric acid into the atmosphere.

What is claimed is:

1. A process for combustion treatment of carbonaceous particles collected on a filter situated in an exhaust circuit of an internal combustion engine, comprising contacting said particles with a gas mixture comprising at least nitrogen dioxide generated within the exhaust circuit of said engine, and thus combusting the particles, said particles having been seeded prior to combustion of the particles with at least one oxidation catalyst therefor, wherein the oxidation catalyst comprises cerium in a mixture with at least one other element selected from zirconium, alkali metals, alkaline earth metals and transition elements.

2. The process according to claim 1, wherein the catalyst for oxidizing said particles comprises at least one element selected from transition metals, alkali metals, alkaline earth metals, and the rare earth metals.

3. The process according to claim 2, wherein the element (s) are present in the catalyst independently of one another in the form of their respective oxide or otherwise.

4. The process according to claim 2, wherein the catalyst for oxidizing said particles comprises at least one element selected from manganese, iron, copper, sodium, nickel and scandium.

5. The process according to claim 1, wherein the oxidation catalyst seeded at level of the carbonaceous particles is incorporated therein via introduction into fuel of a derivative of the oxidation catalyst.

6. The process according to claim 5, wherein the derivative is a salt, sol or organic complex.

7. The process according to claim 1, wherein the oxidation catalyst is seeded at the level of the carbonaceous particles via introduction alternatively into air at an intake of the engine, or into an exhaust gas recirculation (EGR) circuit, or at the exhaust upstream of the filter.

8. The process according to claim 1, wherein the amount of oxidation catalyst seeded at the level of the carbonaceous particles is between 0.1% and 30%, expressed by weight of the catalytic element relative to the weight of the carbonaceous particle.

9. The process according to claim 8, wherein the amount of oxidation catalyst seeded at the level of the carbonaceous particles is between 0.1% and 15%, expressed by weight of the catalytic element relative to the weight of the carbonaceous particle.

10. The process according to claim 8, wherein the amount of oxidation catalyst is at least 0.5%, expressed by weight of the catalytic element relative to the weight of the carbonaceous particle.

11. The process according to claim 10, wherein the amount of oxidation catalyst is at least 2% expressed by weight of the catalytic element relative to the weight of the carbonaceous particle.

12. The process according to claim 10, wherein the catalyst for converting the nitrogen monoxide to nitrogen dioxide is selected from those based on platinum, palladium, ruthenium, rhodium and their mixtures and simple oxides or mixed oxides.

13. The process according to claim 12, wherein the catalyst is deposited on a support of an alumina, titanium, silica or zeolite type in a pure or doped form.

14. The process according to claim 13, wherein the catalyst for converting the nitrogen monoxide to nitrogen dioxide is based on platinum deposited on a lanthanum-doped titanium oxide.

15. The process according to claim 12, wherein the catalyst is selected from the group consisting of metal oxides of the platinum group.

16. The process according to claim 15, wherein the metal oxides of the platinum group is rhodium oxide.

17. The process according to claim 12, wherein simple oxides or mixed oxides are transition metal oxides.

18. The process according to claim 17, wherein the transition metal oxide is based on at least one of cerium, manganese and the perovskite systems.

19. The process according to claim 18, wherein the transition metal oxide is $CeO_2$, $Mn_2O_3$, $Mn_2O_3$—$CeO_2$, or. $Mn_2O_3$—$CeO_2ZrO_2$.

20. The process according to claim 1, wherein a concentration of nitrogen dioxide required for the combustion of said carbonaceous particles is adjusted by a change in control of the engine, performed continuously or discontinuously to induce burning of the carbonaceous particles collected on the filter.

21. The process according to claim 1, wherein a concentration of nitrogen dioxide required for the combustion of said carbonaceous particles is generated catalytically.

22. The process according to claim 21, wherein the catalyst for converting the nitrogen monoxide to nitrogen dioxide is combined with a $NO_x$ trap system.

23. The process according to claim 22, wherein the $NO_x$ trap system is a composition comprising a support based on an oxide of cerium, an oxide of zirconium and an oxide of scandium or of a rare earth other than cerium and an active phase based on manganese and on at least one other element selected from the group consisting of alkali metals, alkaline earth metals and rare earth metals or a composition comprising a supported phase containing manganese and at least one other element selected from terbium, gadolinium, europium, samarium, neodymium and praseodymium and a support based on cerium oxide or a mixture of cerium oxide and zirconium oxide.

24. The process according to claim 1, wherein the nitrogen dioxide is generated by catalytic conversion of nitrogen monoxide.

25. The process according to claim 24, wherein conversion of the nitrogen monoxide to nitrogen dioxide is performed in a step prior to oxidation of the carbonaceous particles.

26. The process according to claim 25, wherein conversion of the nitrogen monoxide to nitrogen dioxide is performed upstream of the filter containing the carbonaceous particles to be oxidized.

27. The process according to claim 25, wherein conversion of the nitrogen monoxide to nitrogen dioxide is performed by contacting the exhaust gas with a conversion catalyst, CC, for converting the nitrogen monoxide to nitrogen dioxide, the conversion catalyst present on a support situated upstream of the filter containing the carbonaceous particles to be oxidized and through which said exhaust gas passes.

28. The process according to claim 1, wherein conversion of the nitrogen monoxide to nitrogen dioxide is performed concomitantly with oxidation of the carbonaceous particles by the nitrogen dioxide thus formed.

29. The process according to claim 28, wherein conversion of the nitrogen monoxide to nitrogen dioxide is carried out at a level of the filter on which the carbonaceous particles to be oxidized are collected.

30. The process according to claim 29, wherein the catalyst permitting conversion of the nitrogen monoxide to nitrogen dioxide is present at the level of the filter containing the carbonaceous particles to be oxidized.

31. The process according to claim 1, wherein the nitrogen dioxide is generated by passing the exhaust gases through a support on which is deposited at least one catalyst for converting the nitrogen monoxide to nitrogen dioxide so as to generate nitrogen dioxide which is subsequently transported by the exhaust gases to a metal filter comprising the carbonaceous particles to be oxidized, which filter is located downstream of the support and at a distance sufficient for the nitrogen dioxide coming into contact with said carbonaceous particles to be present in an amount sufficient to ensure their effective oxidation.

32. The process according to claim 1, wherein the oxidation catalyst is present in a form of an oxide.

33. The process according to claim 1, wherein the at least one other element is selected from Groups IB, VIIB and VIII of the periodic table.

34. The process according to claim 33, wherein the at least one element is copper, manganese or iron.

35. A process for combustion treatment of carbonaceous particles collected on a filter situated in an exhaust circuit of an internal combustion engine, comprising contacting said particles with a gas mixture comprising at least nitrogen dioxide generated within the exhaust circuit of said engine, and thus combusting the particles, said particles having been seeded prior to combustion of the particles with an oxidation catalyst consisting of cerium.

36. The process according to claim 35, wherein the oxidation catalyst is present in a form of an oxide.

37. A process for combustion treatment of carbonaceous particles collected on a filter situated in an exhaust circuit of an internal combustion engine, comprising contacting said particles with a gas mixture comprising at least nitrogen dioxide generated within the exhaust circuit of said engine, and thus combusting the particles, said particles having been seeded prior to combustion of the particles with an oxidation catalyst consisting of iron.

38. The process according to claim 37, wherein the oxidation catalyst is present in a form of an oxide.

39. A process for combustion treatment of carbonaceous particles collected on a filter situated in an exhaust circuit of an internal combustion engine, comprising contacting said particles with a gas mixture comprising at least nitrogen dioxide generated within the exhaust circuit of said engine, and thus combusting the particles, said particles having been seeded prior to combustion of the particles with an oxidation catalyst consisting of a cerium and iron.

40. The process according to claim 39, wherein the oxidation catalyst is present in a form of an oxide.

* * * * *